Feb. 23, 1971      E. D. TAYLOR      3,564,939

GEAR SHIFTING MECHANISM

Filed Aug. 18, 1969      2 Sheets-Sheet 1

INVENTOR
Eugene D. Taylor
by Dressler, Goldsmith,
Clement & Gordon
Att'ys

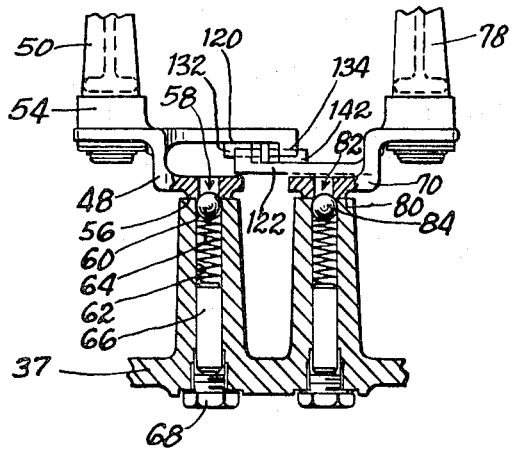
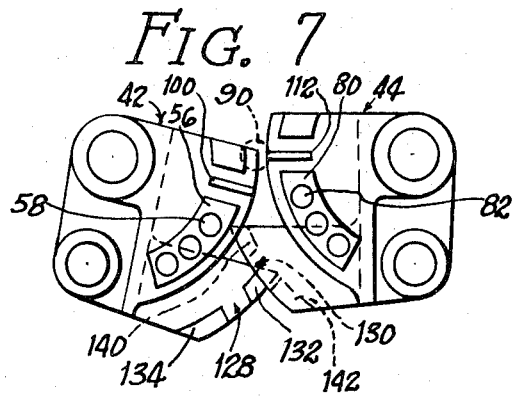
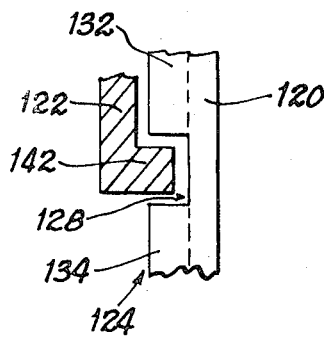
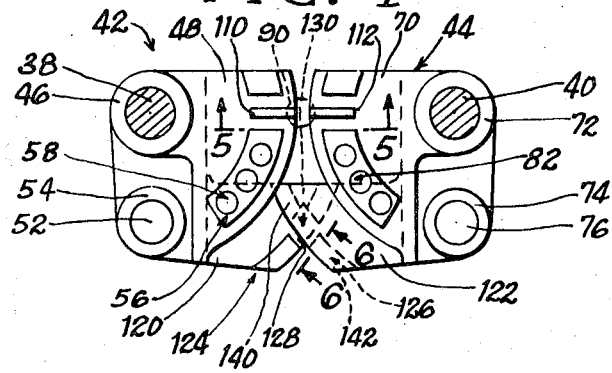
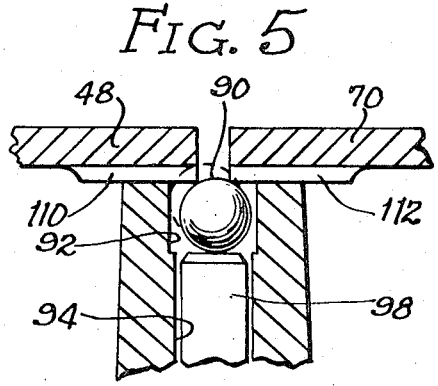
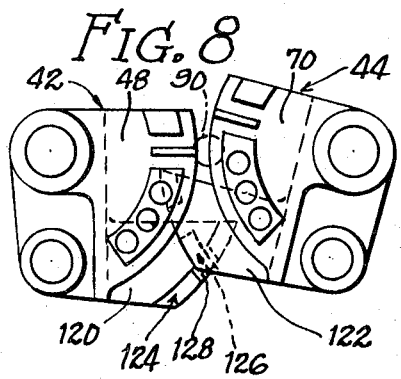

United States Patent Office 3,564,939
Patented Feb. 23, 1971

3,564,939
GEAR SHIFTING MECHANISM
Eugene D. Taylor, Kenosha, Wis., assignor to J. I. Case Company, a corporation of Wisconsin
Filed Aug. 18, 1969, Ser. No. 850,830
Int. Cl. F02d 39/00; G05g 5/10, 9/00
U.S. Cl. 74—851                                           10 Claims

ABSTRACT OF THE DISCLOSURE

A gear shifting mechanism for a transmission and including first and second members rotatable about spaced parallel axes and extending towards each other. The members have overlapping portions which include interlock means to prevent movement of one member from a neutral to an engaged position when the other member is in an engaged position. The members also have cooperating portions which maintain an element cooperating with a switch in the engine starting circuit in a switch closing position when both members are in a neutral position and allow movement of the element to a switch opening position when either member is moved to an engaged position. The members further include surfaces with spaced apertures which receive biased detents to maintain the members in engaged and neutral position.

BACKGROUND OF THE INVENTION

The present invention relates generally to transmissions and more particularly to an improved gear shifting mechanism for transmissions.

With the recent emphasis on greater versatility of agricultural equipment, particularly tractors, most agricultural, as well as industrial, tractors now incorporate transmissions which allow a large number of gear ratios between the input and output shafts of the transmission. Generally, transmissions of this type include a plurality of gears respectively disposed on spaced shafts. The respective gears on the respective shafts are capable of cooperating with gears of the other shaft so as to drive the output shaft at varying speed ratios with respect to the input shaft. Generally, this is accomplished by either sliding the gears into meshing engagement or alternatively to have all of the gears in meshing engagement with each other and providing hydraulic actuating devices for connecting the gears of one shaft to the shaft itself.

One of the most common types of shifting mechanisms presently being utilized is a plurality of rails each supporting a shifting fork with the rails being slidably disposed on a support or alternatively having the shifting fork slidable with respect to fixed rails. The shifting forks are normally moved by one or more control levers extending from the tractor transmission housing.

However, such an arrangement requires a considerable amount of space within the transmission housing for supporting the rails as well as the shifting forks. Because of the large number of gears presently incorporated into a transmission, the space available within the transmission housing has been considerably reduced thereby making it difficult to incorporate a shifting mechanism of the rail and fork type mentioned above.

SUMMARY OF THE INVENTION

The present invention provides a compact shifting mechanism, all of the elements of which may be attached to a cover which may form part of the transmission housing. The shifting mechanism includes a pair of shifting members which are designed and configured to perform the following functions: (1) shifting selected ones of the gears of the transmission to produce a plurality of speed and direction ratios; (2) providing a positive interlock between two of the members to prevent shifting of the second member when the first member is in an engaged position; (3) providing a detent for the shifting member to maintain the shifting member in the plurality of engaged and neutral positions; and (4) simultaneously controlling the engine starting circuit to prevent starting of the engine when the transmission is in an engaged position.

The gear shifting mechanism of the present invention includes a pair of shifting members mounted on shafts rotatable in a housing about spaced parallel axes with each of the members supporting a shifting yoke for engaging gears forming part of the transmission. The shifting members include portions which have opposite free ends in overlapping relationship and have flange means defined on each of the portions which extend towards each other. The flange means each define a slot and the slots are in an aligned position when both shifting members are in a neutral position. When either of the shifting members is moved from a neutral position, a flange portion of such member moves into the slot defined on the other member to prevent shifting of the other member from the neutral position.

The gear shifting mechanism of the present invention further incorporates segments forming part of each of the members with each of the segments having surfaces having a plurality of apertures therein adapted to receive a biased detent mechanism to define the neutral and engaged positions for the respective shifting members. The segments further include cooperating means in the form of a pair of ribs disposed in the path of an element which moves a switch forming part of the starting circuit from the normally closed position to an open position when either of the shifting members are moved from the neutral position.

BRIEF DESCRIPTION OF DRAWINGS

FIG. 3 is a sectional view taken along line 3—3 of FIG. 2;

FIG. 4 is a sectional view taken along line 4—4 of FIG. 1;

FIG. 5 is an enlarged fragmentary sectional view taken along line 5—5 of FIG. 4.

FIG. 6 is an enlarged fragmentary sectional developed view taken along line 6—6 of FIG. 4; and FIGS. 7 and 8 are views similar to FIG. 4 showing the the shifting members in different positions.

DETAILED DESCRIPTION

Figure 1:
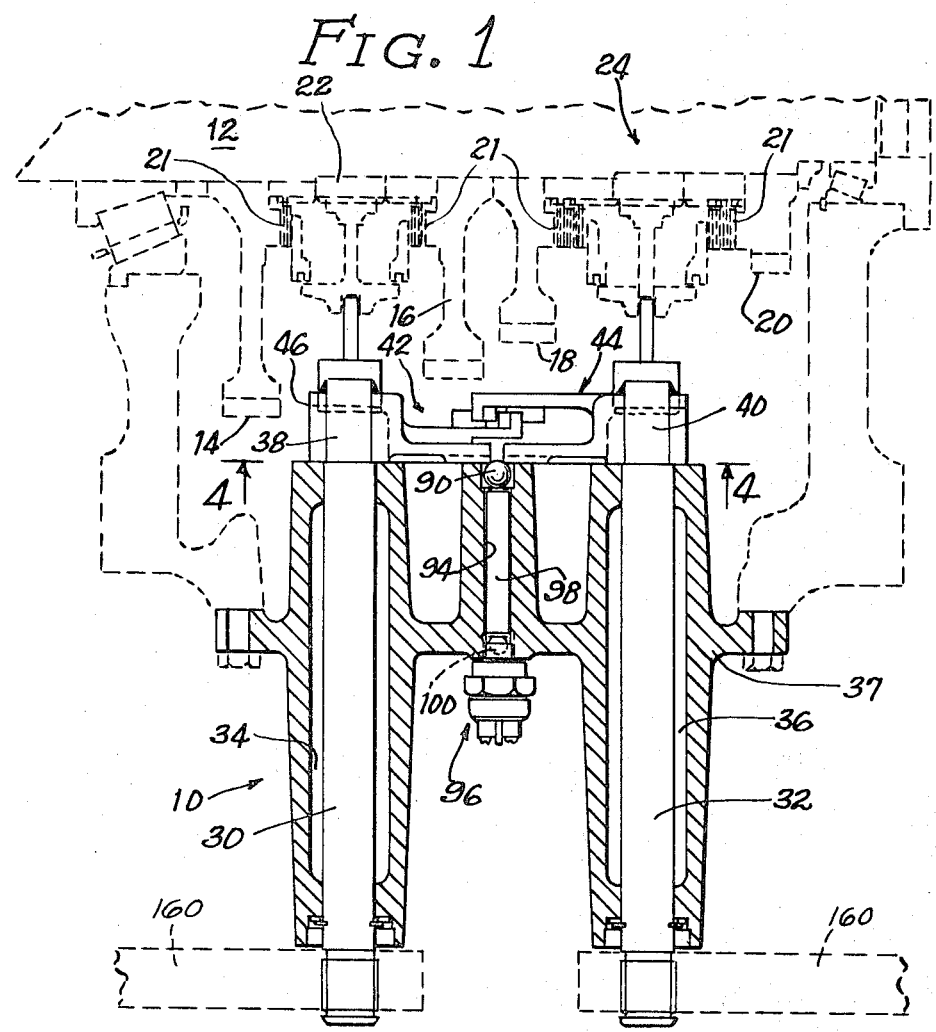
FIG. 1 of the drawings discloses a transverse sectional view of the shifting mechanism constructed in accordance with the present invention and its relationship to a portion of a transmission.
Figure 2:
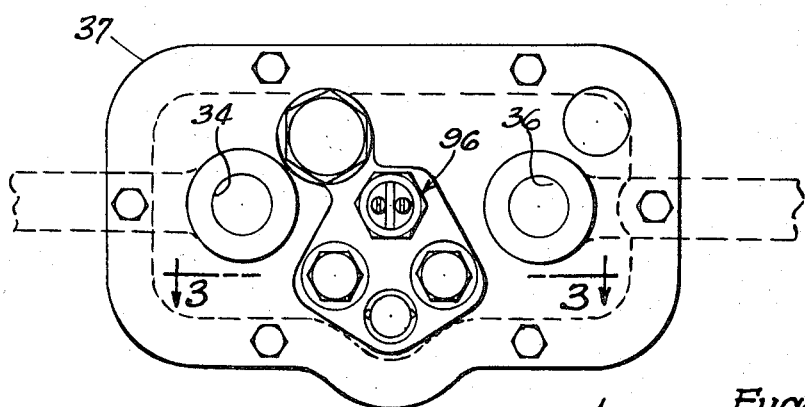
FIG. 2 is a plan view of the cover having the shifting mechanism connected thereto.

Since this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Referring now to the drawings in detail, FIG. 1 discloses a gear shifting mechanism 10 constructed in accordance with the present invention and shown in connection with a portion of a transmission which includes a shaft 12. The shaft 12 has a plurality of gears 14, 16, 18 and 20 freely rotatable thereon which are adapted to be connected to the shaft through friction devices 21 respectively connected to the shaft 12 and to the respective gears. The respective groups of friction devices or disks are adapted to be frictionally engaged by a pair of members 22 and 24 splined to the shaft 12 and adapted to be moved from the neutral position shown by the shifting mechanism of the present invention, which will now be described.

The shifting mechanism of the present invention includes a pair of shafts 30 and 32 which are respectively rotatable about spaced parallel axes in openings 34 and 36 defined in the cover plate or housing 37. The inner free ends 38 and 40 of the respective shafts extend into the transmission housing and have a pair of shifting members 42 and 44 respectively secured thereto for rotation therewith.

The shifting member 42 includes a hub portion 46 (FIGS. 3 and 4) fixedly secured to the free end 38 of shaft 30. The hub 46 has a segment 48 integral therewith and extending towards the second shifting member 44. The shifting member 42 further includes a shifting yoke 50 having a stub shaft 52 extending through a hub 54 formed on the segment 48 with the hub being laterally offset from a plane defined by the two axes of the respective shafts 30 and 32. The free end of the yoke 50 is adapted to engage a slot formed in the member 22, for a purpose which will become apparent hereinafter.

According to one aspect of the present invention, the shifting member 42 includes means for receiving detents (to be described later) to define neutral and engaged positions for the shifting member. For this purpose, the segment 48 has means defining a surface 56 which is located adjacent the housing or cover as more clearly shown in FIG. 3. The surface 56 has means in the form of apertures or recesses 58 which are circumferentially spaced about the axis defined by shaft 30 and which are spaced a common radial distance from said axis. The apertures or recesses 58 are spaced from each other in a manner that the central aperture defines a position for the shifting member 42 which corresponds to a neutral position for the associated gears forming part of the transmission. Also, the remaining two apertures 58 disposed on opposite sides of the central aperture respectively define engaged positions for the member 42 which corresponds to a position causing engagement of the friction devices respectively associated with the gears 14 and 16.

The detent means referred to hereinabove includes a detent or ball 60 which is of slightly greater diameter than the diameter of the apertures 58 and which is slidably disposed in an opening 62 defined in the cover plate. The ball 60 is biased into engagement with the surface 56 by a spring 64 having one end in engagement with the ball and the opposite end in engagement with a pin 66 extending into opening 62 and being retained therein by a threaded plug 68. Thus, it will be seen that the spring 64 will bias the detent or ball 60 into one of the apertures 58 whenever any of said apertures are located in alignment with the axis of the opening 62. It will be appreciated that in order for such action to occur, the axis of the opening 62 must be spaced radially from the axis of shaft 30 by a distance equal to the radial spacing between the apertures 58 and the axis of the shaft 30.

The second shifting members 44 is substantially identical in construction and includes a segment 70 extending from a hub 72 fixedly secured to the free end 40 of the shaft 32 with the segment having a further hub 74 laterally offset from the plane defined between the two axes of the respective shafts 30 and 32. The hub 74 receives the stub shaft 76 of a second yoke 78. The second shifting member 44 again includes means defining a surface 80 having a plurality of apertures 82 which define the neutral and engaged positions for the second shifting member 44 by having a spring biased detent 84 received therein. The spring biased detent 84 is biased in the same manner as that described in connection with the detent 60 and no detailed description thereof appears to be necessary.

According to a further aspect of the present invention, the gear shift mechanism of the present invention further includes means for interrupting a starting circuit of an engine connected to the transmission when either of the shifting members is moved from the neutral position. This latter means includes an element or ball 90 (FIGS. 1 and 5) disposed within an enlarged counterbore 92 formed on the end of an opening 94 defined within the cover plate 37. The opening 94 extends through the cover plate and has a switch 96 threadedly received therein. The switch 96 is biased to a normally open position.

The means for interrupting the starting ciricuit further includes a rod 98 slidable within the opening and having one end in engagement with the switch actuator 100 forming part of the switch 96 and the opposite end in engagement with the element or ball 90. The switch 96 is normally maintained in a closed position by having the element 90 in a first position, corresponding to the solid line position shown in FIG. 5, which is accomplished by cooperating means on the respective segments 48 and 70. The cooperating means accommodate movement of the element or ball 90 from the first or switch closing position when either of the segments, more particularly the members, is moved from the neutral position shown. More specifically the cooperating means includes first and second ribs 110 and 112 respectively extending above the segments 48 and 70 with the respective ribs being disposed below the opening 94 in the path of movement of the element 90. Thus, when either of the shifting members 42 or 44 is moved from the netural position or condition, the associated rib will be moved out of the path of movement of the element 90. The movement of the element 90 from the first or switch closing position is aided by the biasing means (not shown) incorporated within the normally open switch 96 so as to insure that the switch will be caused to open and the elements will be moved axially relative to the opening 94 when either of the shifting members is moved from its neutral position.

According to a further aspect of the present invention, the shifting members 42 and 44 further include interlock means which prevent shifting of one of the members from its neutral position when the other of the members is in an engaged position. The interlock means includes portions 120 and 122 respectively extending transversely to the axes of the shaft 30 and 32 and integral with the segments 48 and 70. The free ends of the portions or fingers 120 and 122 are disposed in overlapping relationship relative to each other and are laterally offset from the plane defined between the axes of the shaft 30 and 32.

The fingers or portions 120 and 122, respectively, have first and second flange means 124 and 126 thereon, which define respective slots 128 and 130. More specifically, the first flange means 124 includes a first projection 132 and a second projection 134 which have adjacent ends spaced to define the slot 128 while the second flange means 126 includes a first projection 140 and a second projection 142 which have adjacent edges spaced to define the slot 130.

As is more clearly shown in FIGS. 4 and 7, the projections 132 and 134 are arcuate and are spaced from the axis of the shaft 30 by a common radial distance while the projections 140 and 142 are likewise arcuate and are spaced a common distance from the axis of the shaft 32. Also, the projections of one finger or portion extend towards the projections of the other finger or portion and have the free ends thereof spaced from the adjacent member by a distance less than the height of the projections on the other member. Stated another way, the free end of the respective projections overlap each other when viewed from a plane transverse to the axis of the respective shafts 30 and 32. Thus, the respective portions 120 and 122, as well as the first and second flange means 124 and 126, are arranged and located so that the slots 128 and 130 will be in aligned or in overlapping relation relative to each other when the two shifting members 42 and 44 are in the neutral position shown by the solid lines in FIG. 4.

The operation of the gear shifting mechanism of the present invention should be generally apparent from the foregoing description of its construction, but will now be summarized briefly. When the two shifting members 42 and 44 are in their neutral position, the respective detents 60 and 84 are located in the central openings of the respective groups of openings 58 and 82. Also, in this position, the slots 128 and 130 are in superposed or aligned relationship with each other, as more clearly shown in FIG. 4. Furthermore, the switch opening element 90 is located in its first or switch closing position by the cooperating means or ribs 110 and 112.

When either of the shifting members is moved by the rotating means or levers 160 to either of the engaged positions loctaed on opposite sides of the respective neutral positions, the following will occur during movement between such positions. Assuming that member 42 is moved in a clockwise direction as viewed in FIG. 4 to the position shown in FIG. 7, the yoke 50 will be moved about the axis of the shaft 30 a sufficient distance to cause the friction disks on the gear 14 and the shaft 12 to be engaged with each other to thereby cause rotation of the gear 14 with the shaft 12. During such movement, the spring biased detent 60 is moved out of the center opening and the spring 64 maintains the detent in engagement with the surface 56 until it is aligned with the subsequent opening 58 at which time the spring 64 will bias the detent 60 into said opening. During the movement of the shifting member 42, the rib 110 is moved out of the path of the element 90 to allow the switch opening element or ball 90 to be moved from the solid line position shown in FIG. 5 to the dotted line position. This movement of element 90 will allow a sufficient axial movement of the member 98 to have the switch actuating member 100 move from its closed position to the open position by the internal spring. In such a condition, the switch 96 will interrupt the starting circuit of the engine (not shown) to prevent a starting thereof while the shifting member 42 is in its engaged position.

Movement of the member 42 from the position of FIG. 4 to that of FIG. 7 will also cause the projection 132 to be moved into the slot 130 defined between projections 140 and 142 to thereby prevent any movement of the second shifting member 44 from the neutral position shown while the member 42 is in the engaged position.

It will be appreciated that all of the above will occur in substantially the same manner if the shifting member 42 is moved in its counterclockwise direction from the position shown in FIG. 4 and also will occur when the second shifting member 44 is moved in either direction or engaged position from the neutral position shown by the solid line of FIG. 4. The shifting member 44 is shown in one engaged position in FIG. 8 for purposes of illustration.

Thus, as can be seen, the shifting mechanism of the present invention provides a simple compact unit in which all of the functions are performed by a unitary member, i.e., either of the members 42 or 44, which need only be rotated a small amount. The compactness of the entire assembly, as well as the fact that the entire assembly is carried by the cover, greatly simplifies the construction as well as the installation and maintenance of the entire unit.

What is claimed is:

1. A gear shifting mechanism for shifting a plurality of gears between neutral and engaged positions comprising: a housing; a pair of shifting members respectively rotatable about spaced parallel axes on said housing and movable between neutral and engaged positions, said members having portions in overlapping relation; shifting yokes respectively carried by shifting members and each adapted to engage and shift gears between neutral and engaged positions; rotating means for moving said members about the respective axes; and interlock means on said members and including first and second flange means on respective ones of said overlapping portions, said flange means respectively defining slots, said slots being aligned when both said members are in a neutral position, one of said flange means being disposed in the slot of the other of said flange means when the shifting member having said one of said flange means is rotated from a neutral position to prevent rotation of the other of said shifting members from its neutral position.

2. A gear shifting mechanism as defined in claim 1, including the further improvement of each of said members including means defining a plurality of apertures spaced from each other, said apertures of each member being spaced a common distance from its axis; and biased detent means associated with each said member, said detent means of each member being spaced from its axis a distance equal to said common distance and aligned with said apertures whereby said detent means are received in one of said apertures when the associated member is in one of said positions.

3. A gear shifting mechanism as defined in claim 1, including the further improvement of means for interrupting a starting circuit when either of said shifting members is moved from a neutral position; said last means including first and second parts respectively defined on said members, and a switch opening element, said parts cooperating to maintain said element in a first position when both said shifting members are in a neutral posiiton and allowing said element to move from said first position when either of said shifting members are moved from the neutral position.

4. A gear shifting mechanism as defined in claim 1, including the further improvement of said shifting members include hubs; first and second segments extending from said hubs and having ends in juxtaposed relation between said axes; said ends being located adjacent said housing; means defining an opening in said housing and having its axis disposed between said ends; a switch opening element movable in said opening; and ribs projecting from said ends towards said element, said ribs on said respective members cooperating to maintain said element in a switch closing position when both shifting members are in a neutral position and accommodating movement of the element to a switch opening position when either shifting member is moved to an engaged position.

5. A gear shifting mechanism as defined in claim 4, including the further improvement of each said segments having a surface adjacent said housing, said surfaces each having a plurality of apertures circumferentially spaced and located a common distance from the axis of the associated member; and first and second spring biased detents supported by said housing, said detents respectively being aligned with the axes of the apertures of respective ones of said members to be received in respective ones of said apertures when said shifting members are in any one of said positions.

6. A gear shifting mechanism as defined in claim 1, in which said rotating means includes first and second shafts extending through said housing and each having respective ones of said shifting members secured to one end thereof and levers on the opposite ends of said shafts.

7. A gear shifting mechanism as defined in claim 1, in which said overlapping portions are laterally offset from a plane extending between said axes; and said first and second flange means each include spaced arcuate projections having spaced adjacent ends defining said slot, said projectons being spaced a common radial distance from the respective axes of said members.

8. In combination with a vehicle having a plurality of shiftable gears, an engine starting circuit having a switch, and an element normally maintaining said switch in a closed postion, a gear shifting mechanism comprising a housing, first and second shafts rotatable about spaced parallel axes in said housing and having free ends within said housing; segments on each of said free ends, said segments each having a surface adjacent said housing; said housing having spaced openings axially aligned with respective ones of said surfaces; detent means in said openings and biased into engagement with said surfaces; means in each of said surfaces receiving said detent means to define neutral and engaged positions for said segments respectively; first and second yokes respectively secured to said segments at locations spaced from the axis of its shaft, said yokes respectively cooperating with gears to move said gears between neutral and engaged positions; cooperating means on said segments maintaining said element in a switch closing position when said segments are both in a neutral position; and means for rotating said shafts to move said segments from a neutral position whereby to engage selected ones of said gears and allow said element to move from the switch closing position and interrupt said starting circuit.

9. The combinations as defined in claim 8, including the further improvement of interlock means preventing rotation of one of said segments when the other of said segments is in an engaged position, said interlock means comprising a portion on each of said segments, said portions having free ends in overlapping relation, said free ends each having a pair of arcuate projections defining a slot, said projections of the respective portions projecting towards each other with said slots being aligned when both said segments are in a neutral position, said projections of one portion being located in the slot of the other portion when one segment is moved to an engaged position whereby to prevent movement of the other of said segments from the neutral position.

10. The combination as defined in claim 8, in which said element comprises a ball within an opening in said housing and said cooperating means comprises a rib on each of said segments, said ribs extending toward said housing and being in engagement with said ball.

References Cited
UNITED STATES PATENTS

| | | | |
|---|---|---|---|
| 3,292,451 | 12/1966 | Jacklin et al. | 74—477 |
| 3,457,798 | 7/1969 | Musgrave | 74—475 |
| 3,481,223 | 12/1969 | Fraser | 74—851 |

LEONARD H. GERIN, Primary Examiner

U.S. Cl. X.R.

74—475, 477